United States Patent
Kempf et al.

(10) Patent No.: US 8,280,183 B2
(45) Date of Patent: Oct. 2, 2012

(54) NOISE ROBUST CONTRAST-ENHANCEMENT ENGINE EMPLOYING IIR FILTERS

(75) Inventors: Jeffrey Matthew Kempf, Allen, TX (US); Christopher Paul Smearing, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 1063 days.

(21) Appl. No.: 12/133,854

(22) Filed: Jun. 5, 2008

(65) Prior Publication Data

US 2009/0304284 A1 Dec. 10, 2009

(51) Int. Cl.
*G06K 9/40* (2006.01)

(52) U.S. Cl. ........................ 382/274; 382/264

(58) Field of Classification Search .......... 382/274, 382/190, 254, 264, 261; 358/1.9
See application file for complete search history.

(56) References Cited

U.S. PATENT DOCUMENTS

| 6,320,620 | B1 * | 11/2001 | Markandey et al. | 348/448 |
| 7,154,556 | B1 * | 12/2006 | Wang et al. | 348/452 |
| 7,268,757 | B2 * | 9/2007 | Ben-David et al. | 345/88 |
| 7,375,760 | B2 * | 5/2008 | Kempf et al. | 348/441 |
| 7,701,512 | B1 * | 4/2010 | Woodall et al. | 348/526 |
| 2002/0149685 | A1 * | 10/2002 | Kobayashi et al. | 348/252 |
| 2007/0171443 | A1 * | 7/2007 | Pan | 358/1.9 |
| 2009/0167789 | A1 * | 7/2009 | Kerofsky | 345/690 |

* cited by examiner

*Primary Examiner* — Chan S Park
*Assistant Examiner* — Nancy Bitar
(74) *Attorney, Agent, or Firm* — Warren L. Franz; Wade J. Brady III; Frederick J. Telecky, Jr.

(57) ABSTRACT

A noise robust contrast-enhancement engine utilizes low-pass infinite-impulse-response filters for enhancing the contrast while preventing noise amplification in video/image signals.

9 Claims, 11 Drawing Sheets

NOISE ROBUST CONTRAST-ENHANCEMENT ENGINE EMPLOYING IIR FILTERS

TECHNICAL FIELD

The technical field of this disclosure relates to the art of image processing; and more particularly to the art of methods and devices for enhancing contrast ratios of display systems while minimizing the amplification of noise.

BACKGROUND

Display systems are limited in their ability to produce life-like images by their inherent contrast, which is the ratio of intensity of the highest luminance parts of a scene and the lowest luminance parts of the scene. Over the past decade, display industries have steadily improved the contrast of display systems, such as display systems employing liquid-crystal cells, liquid-crystal-on silicon, plasma cells, and micromirror based tight valves. Today many display systems using light valves have achieved a dynamic range of around 2000:1. However, this achieved contrast is still far below human visual capabilities or the dynamic range of natural scenes, which is typically around 50,000:1 or even higher. Conventionally, sharpness enhancement filters have been employed to improve perceived contrast, but these filters are costly and/or inherent noise amplification.

Therefore, it is desired to have a method for enhancing the contrast of display systems while minimizing noise amplification.

SUMMARY

As an example, a device for enhancing a contrast in an image is provided herein. The device comprises: a noise estimation unit for estimating a noise floor in the image; an object illumination unit comprising a first infinite-impulse-response filter for deriving a first, signal from a pixel of the image based upon the noise floor, wherein the first signal represents a brightness of the image pixel; a local-illumination unit comprising a second infinite-impulse-response filter for deriving a second signal from the image pixel, wherein the second signal represents an illumination intensity of the image pixel; and an amplification unit for amplifying a difference between the first and second signals.

In another example, a method for enhancing a contrast in an image is disclosed herein. The method comprises: estimating a noise floor of the image; deriving a first signal from a pixel of the image based upon the noise floor using a first infinite-impulse-response filter, wherein the first signal represents a brightness of the image pixel; deriving a second signal from the image pixel using a second infinite-impulse-response filter, wherein the second signal represents an illumination intensity of the image pixel; and amplifying a difference between the first and second signals.

In yet another example, a device for enhancing a contrast in an image is provided herein. The device comprises: a noise estimation unit for estimating a noise floor in the image; and enhancing means for enhancing the image based upon the noise floor and substantially without, amplifying a noise level in the image by using first and second infinite-impulse-response filters.

In yet another example, a method for enhancing a contrast in an image is disclosed herein. The method comprises; calculating a probability that an image pixel of the image is a skin pixel; and enhancing a contrast of the image based upon the calculated probability.

In yet another example, a display system capable of displaying an image is provided. The system comprises: a light valve comprising an array of individually addressable pixels; and a data processing unit for preparing a set of image data from the image, comprising: a contrast-enhancement engine for enhancing a contrast of the image with minimized noise amplification, comprising: first and second infinite-impulse-response filters for generating first and second signals from a set of image components of the image, wherein the first signal represents a brightness of an image pixel; and the second signal represents an illumination amplitude of said image pixel; and an amplification module for amplifying a difference between the first and second signals.

BRIEF DESCRIPTION OF DRAWINGS

FIG. 3a and FIG. 3b demonstrate a method for determining noise floor in noise contaminated images, wherein FIG. 3b is an exploded view of a portion of the image in FIG. 3a;

DETAILED DESCRIPTION OF EXAMPLES

Disclosed herein is a contrast-enhancement engine capable of maximizing the available contrast of a display system while minimizing the amplification of noise with minimal cost impact.

The contrast-enhancement engine employs two low-pass filters, each of which employs an infinite-impulse-response filter, for obtaining two low-pass filtered signals—a noise-free object brightness signal and a noise-free local illumination signal. By amplifying the difference between the two low-pass filtered signals, which are noise free, system contrast is achieved while the noise amplification is minimized or avoided. By adjusting the amount of enhancement based upon local features, the contrast-enhancement engine is capable of preventing artifacts, such as ringing artifacts. By calculating the probability that an input pixel is from a skin tone and assigning different gain to the skin pixels than non-skin pixels, over-enhancement of skin pixels can be prevented. Because the low-pass filtered signals are obtained by two low-pass filters that employ infinite-impulse-response filters and each infinite-impulse-response filter needs 1 line memory, cost and efficiency are improved as compared to finite-impulse-response filters implemented to accomplish the same effect.

The contrast-enhancement engine will be discussed in the following with reference to particular examples. It will be appreciated by those skilled in the art that the following discussion is for demonstration purposes and should not be interpreted as a limitation. Other variations within the scope of this disclosure are also applicable.

Engine Structure

Figure 1:
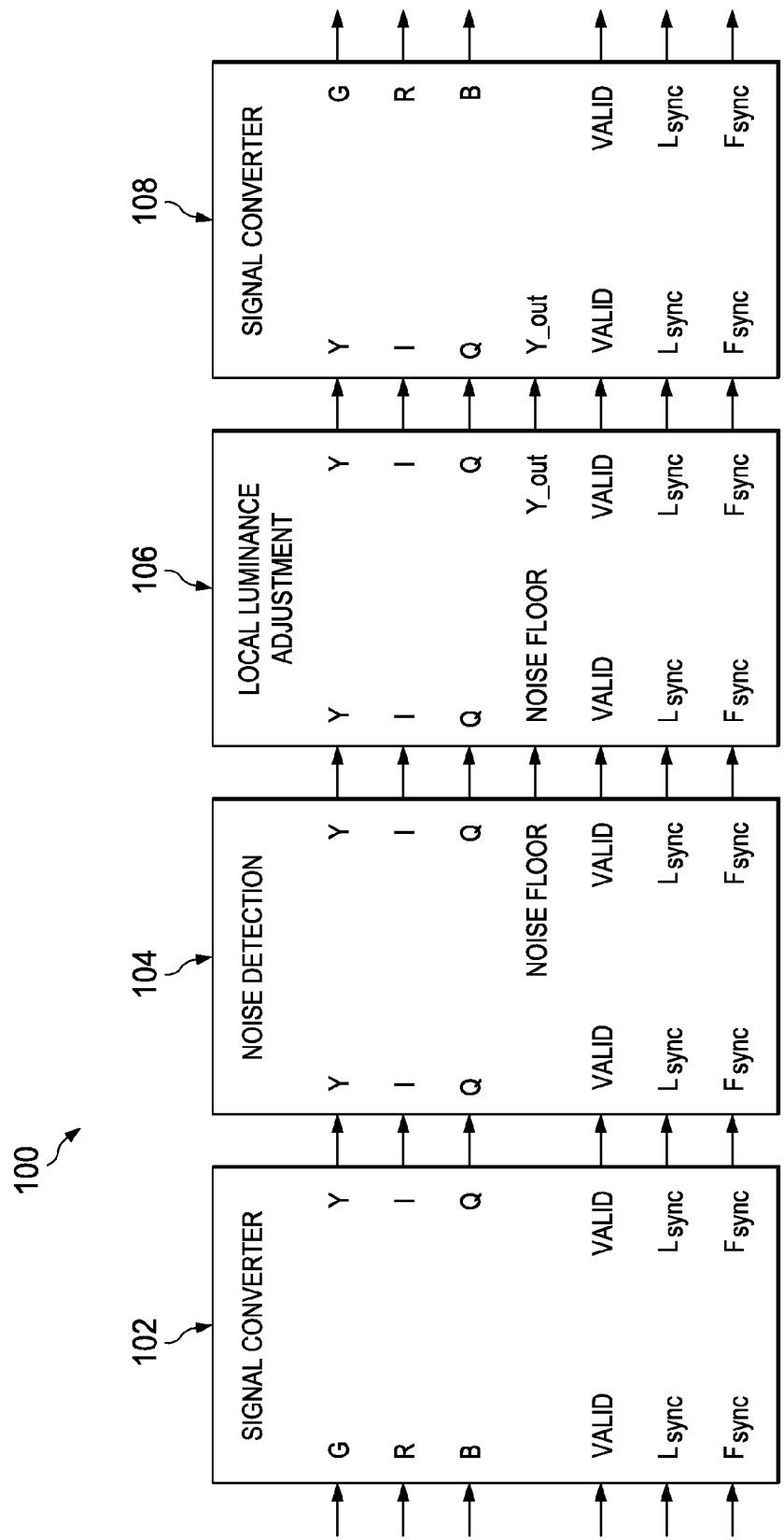
FIG. 1 is a block diagram of a contrast-enhancement engine for use in a display system for enhancing the contrast of the display system while minimizing noise amplification.

Referring to the drawings, FIG. 1 is a block diagram of an exemplary contrast-enhancement engine for use in a display system for maximizing the available contrast of the display system while minimizing the amplification of noise with minimal cost impact. The contrast-enhancement engine (100) in this example comprises noise-detection module 104 and local-luminance-adjustment module 106. Depending upon the specific incoming video signals and the specific application of the processed video signals, the contrast-enhancement engine (100) may further comprise signal converters 102 and/or 108 for converting video signals from one color space or a format to another.

As a general discussion, the noise detection module (104) receives video signals that, comprise a luminance component or a luminance and one or more chrominance components. The detection module (104) estimates the noise floor for the luminance component of the incoming video signals and passes the estimated noise floor to the local-luminance-adjustment module. In the example as illustrated in FIG. 1, the noise detection module (10) receives YIQ video signals, and estimates a noise-floor from the Y component. The estimated noise floor is passed to the local-luminance-adjustment module along with chrominance components I and Q and the luminance component Y.

At the local-luminance-adjustment module (106), the luminance (and chrominance if any) signals are passed through two low-pass filters in the local-luminance-adjustment module (106), wherein the two low-pass filters each employ an infinite-impulse-response filter. One low-pass filter approximates the noise-free object brightness based upon the luminance signal and the estimated noise floor. The other low-pass filter estimates a local illumination component. The local-luminance-adjustment module (106) amplifies the difference between the two low-pass filtered signals so as to enhance the video signals while minimizing the noise amplification. By adjusting the amount of enhancement based upon local features, the local-luminance-adjustment module (106) is capable of preventing artifacts, such as ringing artifacts. By calculating the probability that an input pixel is from a skin tone and assigning different gain to the skin pixels than non-skin pixels, over-enhancement of skin pixels can be prevented. In the example as illustrated in FIG. 1, the local-luminance-adjustment module (106) receives the estimated noise floor and the luminance/chrominance signals YIQ, obtains a noise-free object brightness signal and a local luminance component signal, and derives a contrast-enhanced luminance signal Y_out from the difference between the noise-free object brightness signal and a local luminance component signal. The derived output signal Y_out can then be used as the luminance component for the incoming video signal.

When the enhanced luminance signal (e.g. Y_out) does not match the desired color space, such as a color space defined by a display system (e.g. the RGB color space), the enhanced video signals, such as the enhanced YIQ(Y_outIQ) signals, can be converted to video signals in the desired color space by signal converter 108. When the enhanced luminance signal matches the desired color space, signal converter 108 may not be necessary.

In examples wherein the input video signals to the contrast-enhancement engine do not comprise a luminance component, such as RGB video signals, the video signals can be passed through signal converter 102 that converts the incoming video signals (e.g. RGB signals) from one format or color space to video signals that comprise a luminance component, such as HSV, $YC_bC_r$, xvYCC video signals and many other types of video signals having luminance components.

It is noted that, regardless of different formats or color spaces of the video signals input to or output from the contrast-enhancement engine (100), the contrast-enhancement obtains a luminance component signal from the input video signals and performs the contrast-enhancement on the obtained luminance component signal. It is further noted that the incoming video signals may not comprise chrominance components, such as video signals from gray scale videos. In these examples, contrast-enhancement is applied to the luminance component by the contrast-enhancement engine.

For demonstration purposes, structures and operations of the contrast-enhancement engine (100) will be discussed in the following with particular examples wherein the incoming video signal to the contrast-enhancement engine are RGB video signals; and the contrast-enhancement engine performs contrast enhancement based upon the YIQ signals derived from the RGB video signals. It will be appreciated by those skilled in the art that other variations are also applicable. For example, the incoming video signals can be other non-RGB video signals. The contrast-enhancement engine may perform its contrast-enhancement operation based upon other video formats or in other color spaces that comprise at least a luminance video component. The contrast-enhanced video signals from the contrast-enhancement engine may be directly used by the subsequent members, or can be converted to video signals in a selected format or a color space.

Signal Converter

Input video or image signals (hereafter video signals) in the RGB format are delivered to the signal converter (102) that is implemented as a RGB-to-YIQ conversion module in this example through inputs G, R, B, valid, $L_{sync}$, and $F_{sync}$. Specifically, the green, red, and blue color components of the input video signal are respectively fed into the G, R, and B inputs of the signal converter (102). The "valid" signal inserted for each active pixel in the input video signal is delivered to the valid input of the converter (102). The $L_{sync}$ signal, which is the line synchronization signal, and the $F_{sync}$ signal, which is the frame synchronization signal, are respectively delivered to the $L_{sync}$ and $F_{sync}$ inputs of the signal converter (102).

The input red, green, and blue signals are converted to Y, I, and Q signals in the YIQ format using equation 1. It is noted that when the incoming video signals are not RGB signals or the contrast-enhancement engine (100) performs contrast-enhancement operation based upon other signals than the YIQ signals, the conversion matrix in equation 1 can be different.

$$\begin{bmatrix} Y \\ I \\ Q \end{bmatrix} = \begin{bmatrix} c_{11} & c_{12} & c_{13} \\ c_{21} & c_{22} & c_{23} \\ c_{31} & c_{32} & c_{33} \end{bmatrix} \begin{bmatrix} R \\ G \\ B \end{bmatrix} \quad \text{(Eq. 1)}$$

$$= \begin{bmatrix} 0.299 & 0.587 & 0.114 \\ 0.5 & -0.230356 & -0.296944 \\ 0.202315 & -0.5 & 0.297685 \end{bmatrix} \begin{bmatrix} R \\ G \\ B \end{bmatrix}$$

Noise-Detection Module

The converted YIQ signals and the valid, $L_{sync}$, and $F_{sync}$ signals are delivered to the noise-detection module (104) that detects the noise level and separates the meaningful scene content from noise in the input video signals.

Noise in video signals comes from a variety of noise sources, such as image- and video-taking hardware and the subsequent image processing processes. Regardless of different noise sources, it is assumed that noise in the video signals follows a Gaussian distribution. Specifically, an amount of noise is added to every part of the image. Each pixel in the image is changed from its original value by a small amount. Taking a plot of the amount of distortion of a pixel against the frequency with which it occurs produces a Gaussian distribution. Properties of Gaussian noise in an image are summarized as follows.

Mathematical Basis

In two dimensions, an isotropic (i.e. circularly symmetric) Gaussian function has the form as show in equation 2:

$$G(x, y) = \frac{1}{2\pi\sigma^2} e^{-\frac{(x-\mu)^2}{2\sigma^2}} \quad \text{(Eq. 2)}$$

The coefficient $\mu$ is the mean; and $\sigma$ is the standard deviation. A noise contaminated image can be mathematically expressed as equation 3:

$$I(i,j) = X(i,j) + N(i,j) \quad \text{(Eq. 3)}$$

In equation 3, $I(i,j)$ represents the contaminated image; $X(i,j)$ represents the uncontaminated image (noise-free image) component; $N(i,j)$ represents noise; and $(i,j)$ is the pixel coordinate. Noise $N(i,j)$ in the image has a Gaussian distribution with zero mean ($\mu=0$) and variance $\sigma_n^2$, wherein $\sigma_n$ is the standard deviation of Gaussian distribution $N(i,j)$.

Given the Gaussian distribution property, the total variance $\sigma_t^2$ of a Gaussian-noise contaminated image is the summation of variance $\sigma_X^2$ of the uncontaminated image (noise-free image) and variance $\sigma_n^2$ of noise, as expressed in equation 4.

$$\sigma_t^2 = \sigma_X^2 + \sigma_n^2 \quad \text{(Eq. 4)}$$

Noise Floor Estimation

With the Gaussian noise assumption, the noise-detection module (104) estimates the noise floor of incoming images, in one example, the noise-floor estimation is performed based upon "flat image areas" of incoming images. A flat image area is referred to as an image area wherein the noise-free component of the image area has substantially zero variance. The high-frequency variation of a flat image area is attributed to noise, which can be expressed as equation 5.

$$\sigma_t^2 = \sigma_X^2 + \sigma_n^2 = 0 + \sigma_n^2 = \sigma_n^2 \quad \text{(Eq. 5)}$$

Figure 3A:
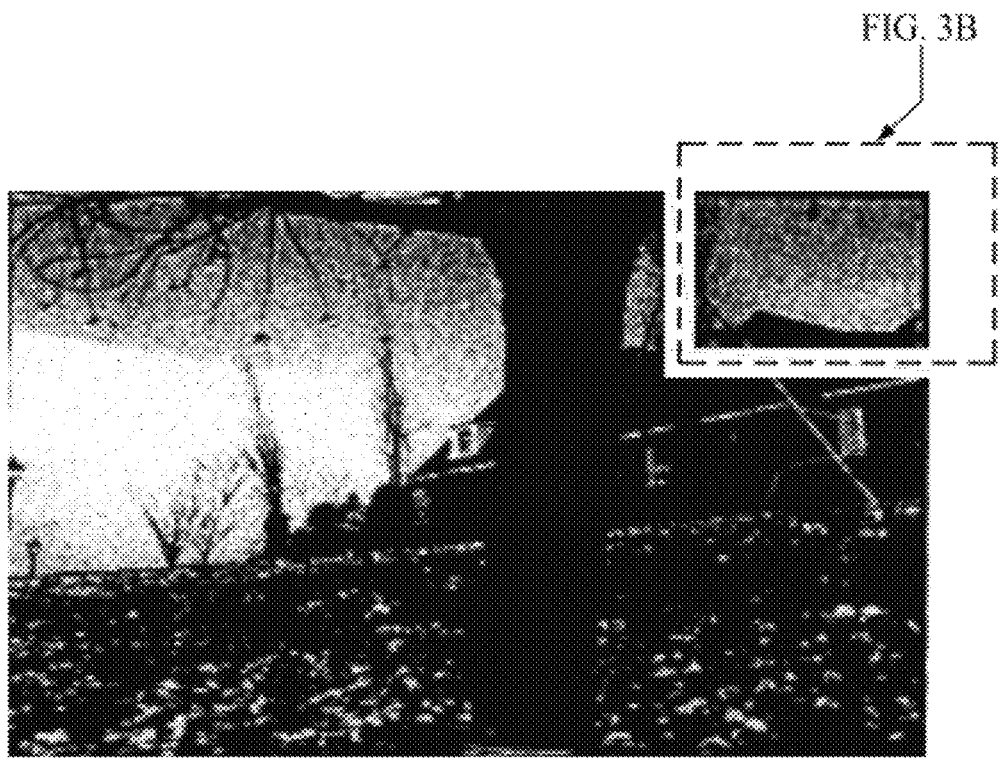
Figure 3B:

In equation 5, $\sigma_t^2$ is the total variance of the flat image area; $\sigma_X^2$ is the variance of the noise-free component of the flat image area; and $\sigma_n^2$ is the variance of noise in the flat area. Typically, a flat, image area has a single color or a simple texture, such as sky, walls, and object surfaces. For demonstration purpose, FIG. 3a shows an exemplary noise-contaminated image. The image comprises a sky portion as shown in the exploded view in FIG. 3b.

It can be seen in equation 5 that, the variance of noise in a flat image area is substantially the total variance of the flat image area. By analyzing the variance of a flat image area, the noise variance of the flat image area can be obtained. By assuming that all portions of an input image have substantially the same noise variance, the noise variance of the entire input image can be approximated by the noise variance of the flat image area of the input image. Accordingly, the noise floor of the entire input image can be calculated from the noise floor of the flat image area of the input image. In one example, the noise-floor of an input image can be estimated with the assumption that the majority of the incoming image is composed of flat image areas. Hence, the first peak in a histogram of sample standard deviations is substantially attributed to additive noise. For demonstration purposes, FIG. 2 shows a flow chart of an exemplary noise-floor estimation process.

Figure 2:
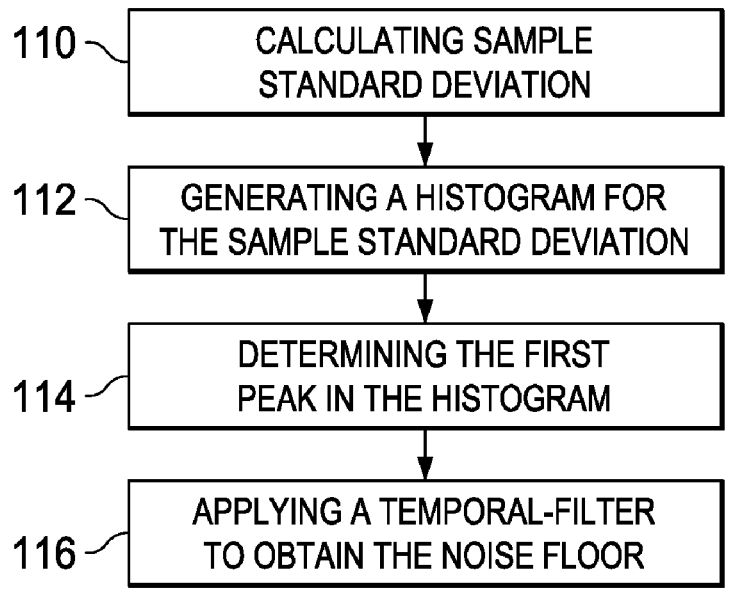
FIG. 2 is a flow chart showing the steps executed for detecting image noise.

Referring to FIG. 2, the exemplary noise-floor estimation process starts from step 110 wherein the sample standard deviations are calculated. For calculating the sample standard deviations of the luminance component Y of image pixels of an incoming image, a two-dimensional detection window n×n is employed with n being any suitable numbers, such as 3 and 7. In one example, 3×3 or 7×7 detection window can be used. A sample variance for an image pixel (x, y) can be calculated for the pixels in the detection window using equation 6. A set of sample variances at different image pixels can be calculated by sliding the detection window across the entire incoming image or, alternatively, across a selected portion in the incoming image.

$$V(x, y) = \frac{1}{n^2 - 1} \sum_{i=-n/2}^{n/2} \sum_{j=-n/2}^{n/2} [Y](x + i, y + j) - \mu(x, y)]^2 \quad \text{(Eq. 6)}$$

In equation 6, V(x, y) is the variance of the Y component at position (x, y). n is the dimension of the n×n detection window. Y(x+i, y+j) is the Y component at position (x+i, y+j). $\mu$(x, y) is the mean at position (x, y). In order to minimize the implementation costs, the variation calculation using equation 6 can be replaced by a simple activity measurement such as the mean absolute difference.

By moving the detection window across the incoming image or across a selected portion of the incoming image, a set of variance values can be obtained. A histogram is employed to count the frequency of occurrence of each discrete sample variance in the calculated set of variance (step 112). Starting from the lowest bin and zero sample variance, a search algorithm locates the first peak in the histogram (step 114). Because the noise floor determines the amount of least possible variance, this first peak in the histogram is equivalent to the noise floor. For demonstration purpose, FIG. 4 shows a histogram obtained from a flat image area of an exemplary image.

Figure 4:
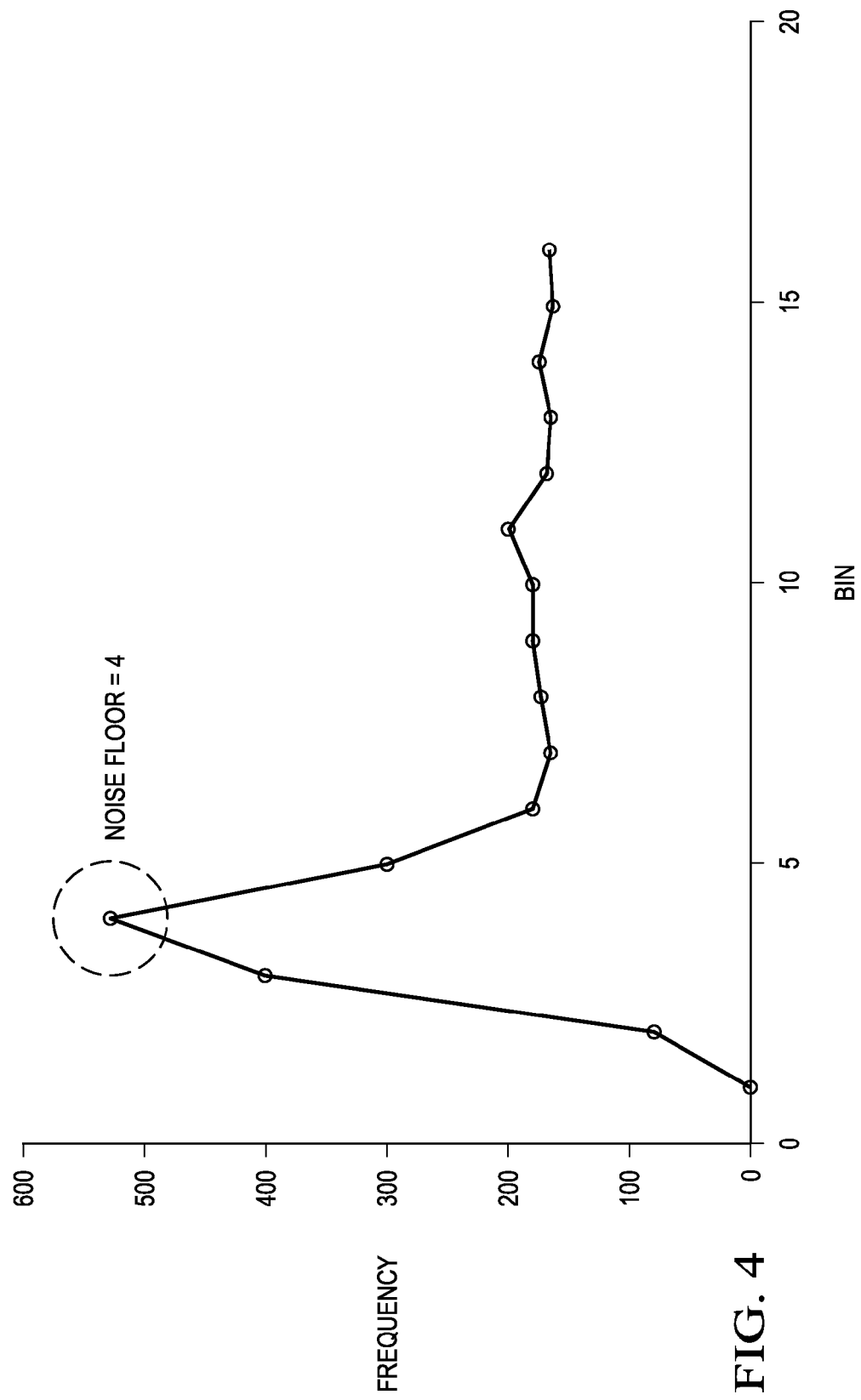
FIG. 4 shows a histogram of sample variances in an exemplar image for determining the noise floor.

Referring to FIG. 4, the horizontal axis plots the bin of the sample variance; and the vertical axis plots the frequency of occurrence of each discrete sample variance. The first peak in this example is located at bin 4, which indicates that the noise floor is 4.

Referring again to FIG. 2, in order to achieve a consistent and stable estimation, the noise floor can be filtered by a temporal recursive filter (step 116). The recursive filter can be implemented according to equations 7a and 7b.

If $(\text{max\_bin} \geq \text{peak\_thr} \times \text{mean\_bin})$ AND (Eq. 7a)

$$\left(\left|\frac{\text{max\_bin\_loc} - \text{max\_min\_nf}}{\text{max\_bin\_loc} + \text{max\_min\_nf}}\right| \leq \text{ave\_thr}\right) n(T) =$$

$$a_n n(T-1) + (1-a_n) r(T) \times \text{max\_bin\_loc}$$

Otherwise, $n(T) = n(T-1)$ (Eq. 7b)

In equation 7, n(T) is the filtered noise floor for the current video frame T. r(T) is the un-filtered noise floor for the current video frame T. n(T−1) is the filtered noise floor for the previous video frame T−1. $\alpha_n$ is the user-defined noise floor recursive coefficient, which is between zero (inclusive) and 1. Parameter mean_bin is the mean value of bins HIST[0], HIST[1], ... HIST[n]. Parameter max_bin is the maximum value of bins HIST[0], HIST[1], ... HIST[n]. Parameter max_bin_loc is the bin number that contains max_bin(0−n) in the histogram. Parameter man_min_nf is the noise floor calculated by a method set forth in U.S. Pat. No. 7,139,035 issued Nov. 21, 2006, the subject matter of which is incorporated herein by reference in its entirety, and is attached herein as Appendix A. Parameter peak_thr is the threshold for determining the dominant peak in the histogram. This threshold is a user-defined parameter with a default value of 1.5 (or other numbers). Parameter ave_thr is the threshold for determining the presence of flat fields, which is a user defined parameter with a default value of 0.25 (or other numbers). After each estimation, the estimated noise-floor may be updated if there is a high level of confidence, clear peak in the histogram and the difference between the two floor measurement techniques is low. By using the above estimation method, unusually high noise floor measurements from incoming images that violate the flat field assumption can be avoided.

It is noted that the method for estimating the noise floor of an input image as discussed above is only one of many possible ways. Other methods are also applicable. For example, the method set forth in U.S. Pat. No. 7,139,035 to Kempf, issued Nov. 21, 2006, can be used alone for estimating the noise floor of an incoming image. In another example, the noise floor can be estimated based upon equation 7c.

$$n(T) = \alpha_n n(T-1) + (1-\alpha_n) r(T) \quad \text{(Eq. 7c)}$$

Local Luminance Adjustment Module

Referring back to FIG. 1, the estimated noise floor by noise-detection module (104) is passed to local-luminance-adjustment module 106. The local-luminance-adjustment module (106) comprises two low-pass fillers, each of winch employs an infinite-impulse-response filter. One filter estimates noise-free object brightness; and the other filter approximates a local illumination component of the incoming video signal. The local-luminance-adjustment module (106) amplifies the difference between the two low-pass filtered signals so as to enhance the video signal while minimizes the noise amplification. The probability that an input image pixel is from a skin tone can alternatively be determined. This probability can be used to apply a different enhancement gain to skin pixels than non-skin pixels so as to avoid over-enhancement of skin pixels.

Figure 5:
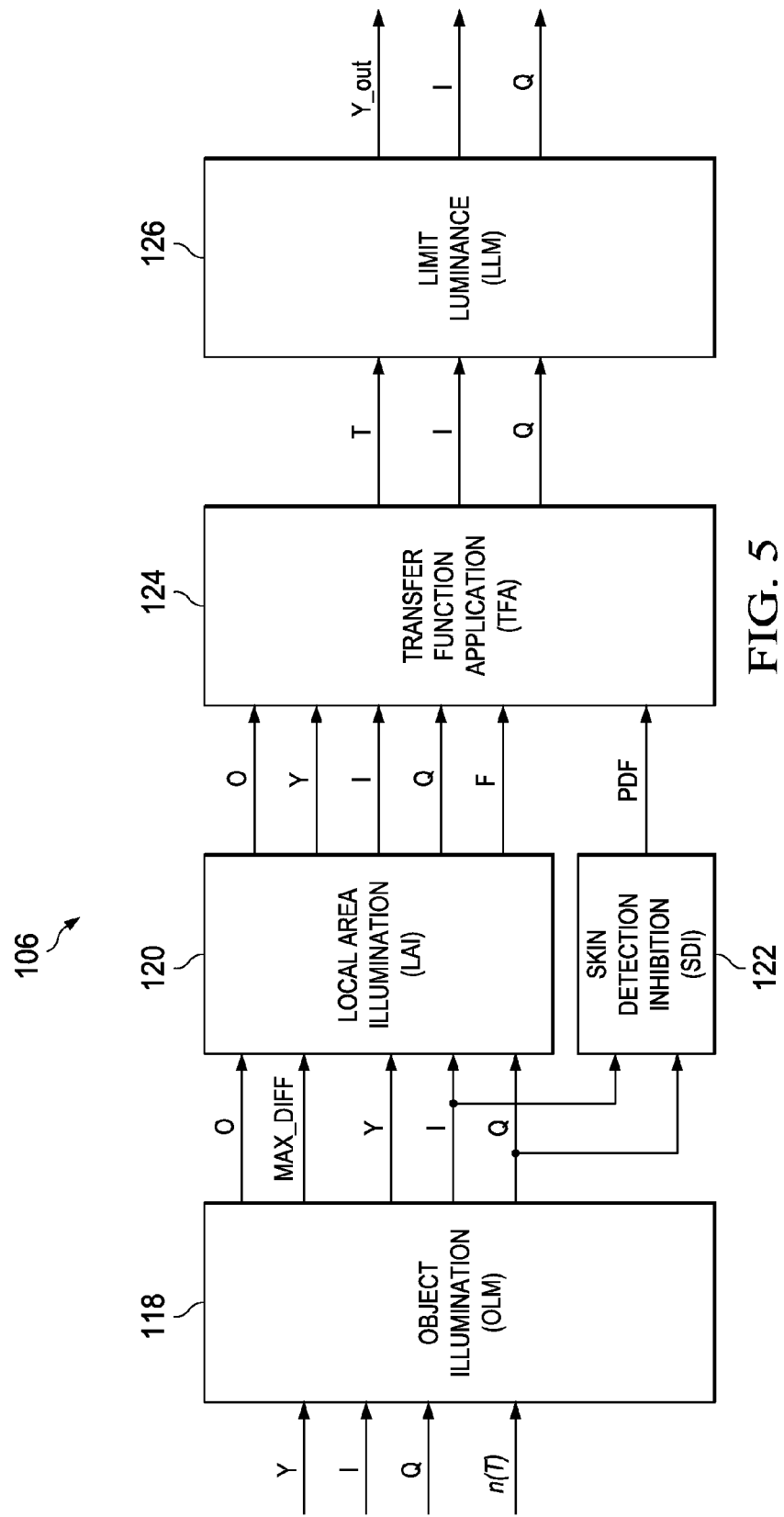
FIG. 5 is block diagram of an exemplary location-luminance-adjustment module in the contrast-enhancement engine illustrated in FIG. 1.

For demonstration purposes, FIG. 5 shows a diagram of an exemplary local-luminance-adjustment module 106. Referring to FIG. 5, the local-luminance-adjustment module (106) in this example comprises object-illumination module 118, local-area-illumination module 120, skin-detection inhibition module 122, transfer function application module 124, and limit luminance module 126.

Object Illumination Module

Figure 6:
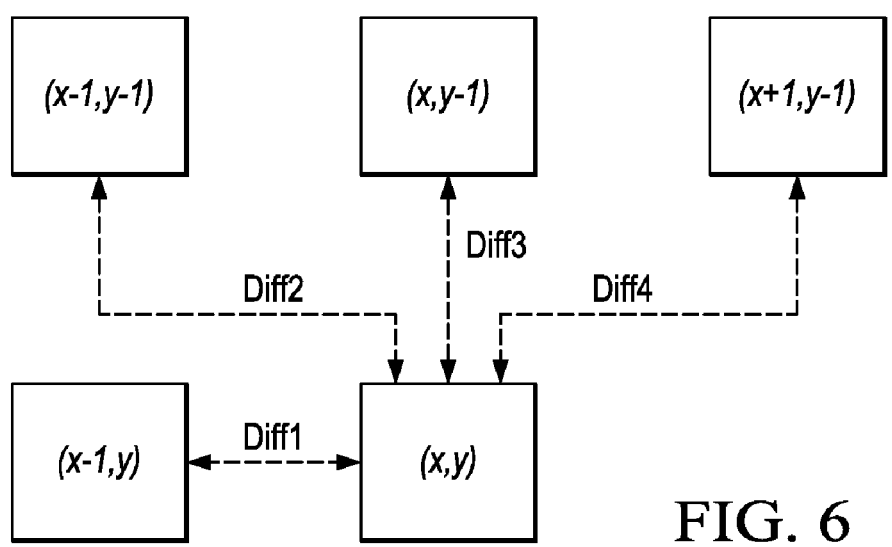
FIG. 6 diagrammatically illustrates an exemplary method for use in calculating the coefficients of a noise-free object brightness IIR filter that is used in the exemplary location-luminance-adjustment module as illustrated in FIG. 5

The object-illumination module (118) employs an infinite-impulse-response-filter (IIR filter) to derive noise-free object brightness O from the input YIQ signals and the noise-floor n(T). In one example, the noise-free object brightness O is calculated from a spatial and temporal recursive process according to an infinite-impulse-response filtering process, which involves a group of image pixels of the input image. In particular, the recursive process calculates signal O from a group of processed pixels with user-defined initial values (boundary values). As an example in a raster scanning, FIG. 6 diagrammatically illustrates a group of image pixels that are included in the spatial and temporal recursive process. In this example, calculation of the noise-free object brightness O at location (x, y) involves image pixels at locations (x−1, y), (x−1, y−1), (x, y−1), and (x+1, y−1), the pixels of which are "scanned" prior to pixel (x, y). In other examples, the temporal recursive process may include any suitable image pixel groups with pixel (x, y) to be substantially the only un-scanned pixel in the group. For example, a pixel group comprising pixels (x−2, y), (x−2, y−1), (x, y−1), (x+1, y−1), (x, y−1), (x+2, y−1), and (x, y) can be used for calculating O at position (x, y).

With reference to the image pixel group in FIG. 6, the noise-free object brightness O at location (x, y) can be calculated from equation 8.

$$O(x, y) = [1 - \alpha_O(x, y)] \times Y(x, y) + \quad \text{(Eq. 8)}$$

$$\alpha_O(x, y) \times [\beta_1^O \text{coef}1 \times O(x-1, y) +$$

$$\beta_2^O \text{coef}2 \times O(x-1, y-1) + \beta_3^O \text{coef}3 \times O(x, y-1) +$$

$$\beta_4^O \text{coef}4 \times O(x+1, y-1)] \div$$

$$[\beta_1^O \text{coef}1 + \beta_2^O \text{coef}2 + \beta_3^O \text{coef}3 + \beta_4^O \text{coef}4]$$

In equation 8, O(x−1, y), O(x−1, y−1), O(x, y−1), and O(x+1, y−1) are noise-free object brightness at locations (x−1, y), (x−1, y−1), (x, y−1), and (x+1, y−1), respectively. Coefficients $\beta_i^O$ (including $\beta_1^O$, $\beta_2^O$, $\beta_3^O$, and $\beta_4^O$) can be any suitable values as long as the sum of $\beta_i^O$ is substantially 1 ($\beta_1^O + \beta_2^O + \beta_3^O + \beta_4^O = 1$). In general $\beta_i^O$ can be expressed as $\beta_i^O = Nb/Db$, wherein Nb and Db are integers. For reducing implementation costs, the denominator Nb is preferably (though not required) an integer power of 2, such as $2^m$, wherein m is an integer greater than 1. In one example, $\beta_1^O$ is 7/16; $\beta_2^O$ is 1/16; $\beta_3^O$ is 5/16; and $\beta_4^O$ is 3/16. $\alpha_O(x, y)$ is the recursive coefficient for O(x, y) at position (x, y), and can be calculated using equation 9.

$$\alpha_O(x,y) = \alpha_{Omax} \text{Max}(\text{coef}1, \text{coef}2, \text{coef}3, \text{coef}4) \quad \text{(Eq. 9)}$$

In equation 9, $\alpha_{Omax}$ is the maximum recursive amount, which can be determined by the user. Max is the maximum operation that outputs the maximum value of coef1, coef2, coef3, and coef4. coef1, coef2, coef3, and coef4 are the coefficients of the noise-free object brightness IIR filter, which can be determined as follows with reference to FIG. 6.

It is defined that 1) Y(x, y) being the input luminance at position (x, y);
2) O(x, y) being the noise-free object brightness at position (x, y);
3) Diff1 being the absolute difference between O(x−1, y) and Y(x, y);

4) Diff2 being the absolute difference between O(x−1, y−1) and Y(x, y);
5) Diff3 being the absolute difference between O(x, y−1) and Y(x, y);
6) Diff4 being the absolute difference between O(x+1, y−1) and Y(x, y);
7) max_diff being the maximum value of diff1, diff2, diff3, and diff4, which can be expressed as max_diff=MAX (diff1, diff2, diff3, diff4); and
8) γ being the noise-floor coefficient winch is a user-defined parameter.

With the above definition, if diff1 is equal to or less than γn(T), coeff1 is set to [1−diff1/γn(T)]. Otherwise, coeff1 is zero. If diff2 is equal to or less than γn(T), coeff2 is set to [1−diff2/γn(T)]. Otherwise, coeff2 is zero. If diff3 is equal to or less than γn(T), coeff3 is set to [1−diff3/γn(T)]. Otherwise, coeff3 is zero. If diff4 is equal to or less than γn(T), coeff4 is set to [1−diff4/γn(T)]. Otherwise, coeff4 is zero.

The effect of the noise-adaptive parameters coef1, coef2, coef3, and coef4 is to attenuate noise in the input video signal. The noise floor coefficient γ can take any suitable values. In one example, the noise floor coefficient γ can be set to 6, which provides a 99% confidential interval with the Gaussian noise assumption. As the difference between Y and the previously filtered O value decreases, each corresponding noise-adaptive parameter (coef1, coef2, coef3, and coef4) approaches one. Conversely, as the difference between Y and the previously filtered O value increases, each corresponding noise-adaptive parameter (coef1, coef2, coef3, and coef4) approaches zero.

In order to minimize implementation costs, a linear relationship can be employed; while other more complex transfer functions can be utilized. The recursive coefficient $\alpha_O(x, y)$ is dependent from the most correlated coefficient.

Figure 7:
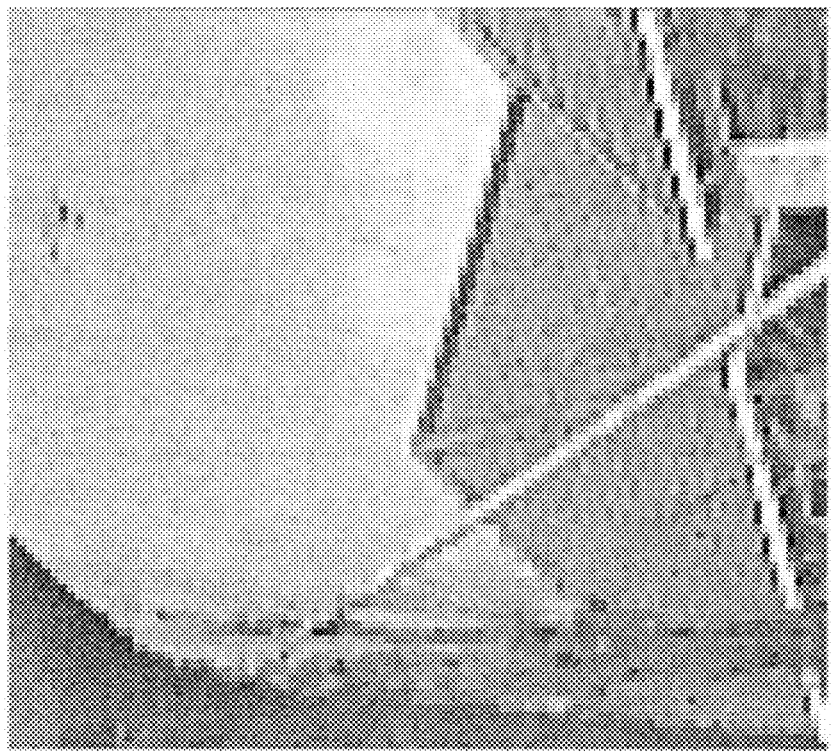
FIG. 7 demonstrates the effect of the noise-free object brightness IIR filter by comparing pictures before and after applying the noise-free object brightness IIR filter.
Figure 7:
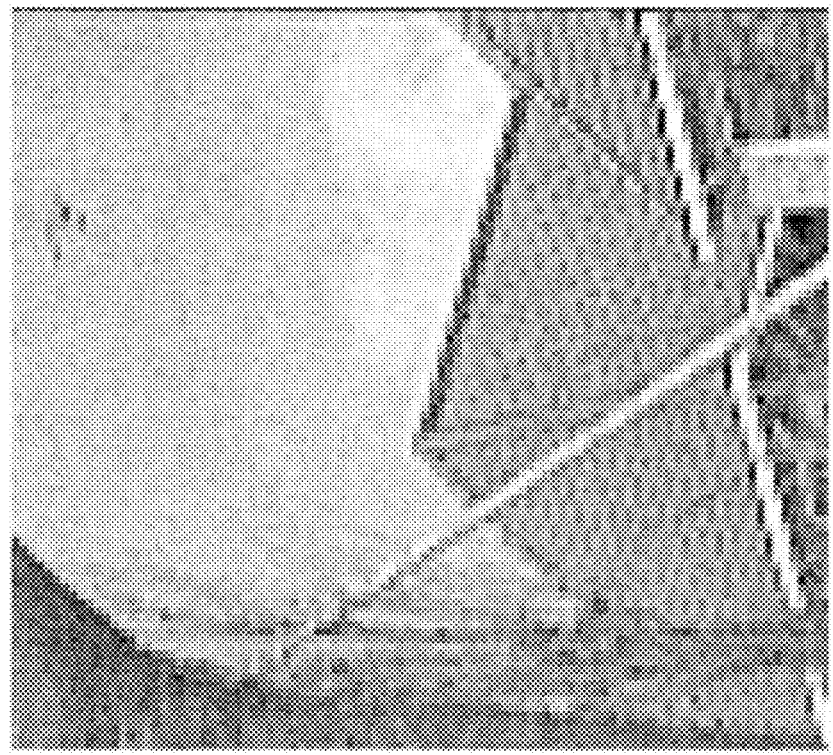

In all, the noise-free object IIR filter is capable of attenuating noise in the input video signal; while maintaining natural edges and textures in the image of the input video signal, which is demonstrated in exemplary pictures in FIG. 7. Referring to FIG. 7, the left picture is unfiltered with input luminance Y; and the right picture is filtered with noise-free object brightness O. By comparing the right and the left pictures, it can be seen that the right picture has substantially the same feature details, such as house ridges and the trunk. Noise in the right picture, such as in the sky portion, is less than that in the corresponding sky portion of the left picture.

Local Illumination Component

Referring again to FIG. 5, the filtered signal O and the calculated max_diff signal, along with the Y, I, and Q signals, are passed from the object-illumination module (118) to the local-illumination-component module (120) that derives a local-illumination-component signal F from the input signals. As an example, FIG. 8 shows a block diagram of the local-illumination-component module (120).

Figure 8:
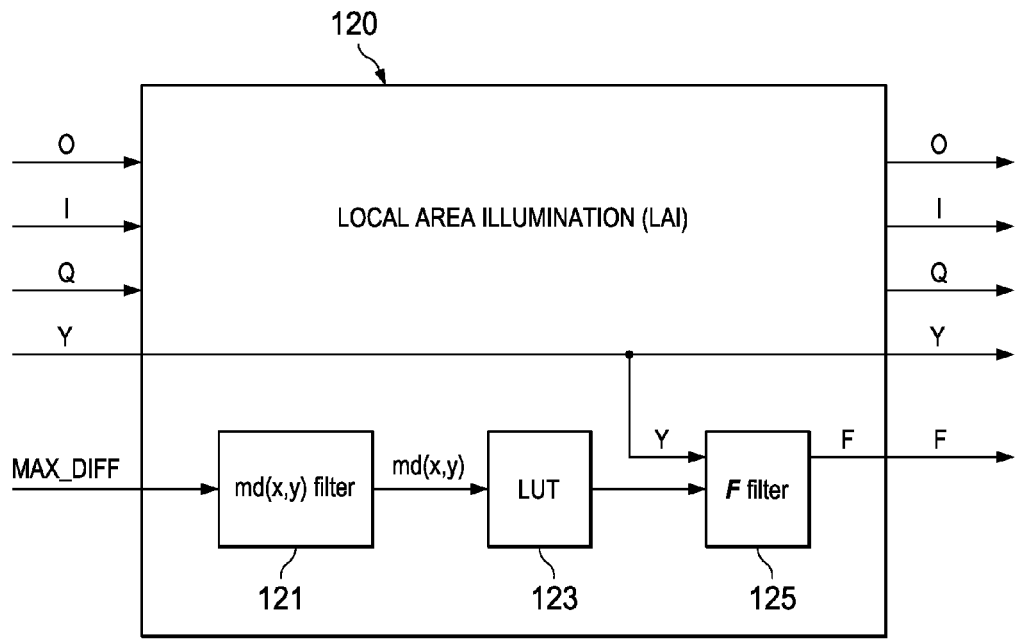
FIG. 8 is a diagram of an exemplary-local-illumination-component module in FIG. 5.

Referring to FIG. 8, in order to minimize artifacts, such as the appearance of halos around the sharp transitions, which is referred to as the ringing artifact, the maximum difference (max_diff) can be filtered by md(x, y) filter 121. The md(x, y) filler (121) can be a low-pass infinite-impulse-response filter that is implemented according equation 10.

$$md(x,y)=(1-\alpha_{md})\times \text{max\_diff}(x,y)+\alpha_{md}\times[\beta_1^{md}md(x-1,y)+\beta_2^{md}md(x-1,y-1)+\beta_3^{md}md(x,y-1)+\beta_4^{md}md(x+1,y-1)] \quad \text{(Eq. 10)}$$

In equation 10, md(x, y) is the filtered maximum difference at position (x, y). md(x−1, y), md(x−1, y−1), md(x, y−1), and md(x+1, y−1) are the filtered maximum differences at positions (x−1, y), (x−1, y−1), (x, y−1), and (x−1, y−1), respectively. $\alpha_{md}$ is the recursive coefficient for the maximum difference signal, and is user-defined. Coefficients $\beta_1^{md}$ (including $\beta_1^{md}$, $\beta_2^{md}$, $\beta_3^{md}$, and $\beta_4^{md}$) can be any suitable values as long as the sum of $\beta_i^{md}$ is substantially 1 ($\beta_1^{md}+\beta_2^{md}+\beta_3^{md}+\beta_4^{md}=1$). In general, $\beta_i^{md}$ can be expressed as $\beta_i^{md}=Nb/Db$, wherein Nb and Db are integers. For reducing implementation costs, the denominator Nb is preferably (though not required) an integer power of 2, such as $2^m$, wherein m is an integer greater than 1. In one example, $\beta_1^{md}$ is 7/16; $\beta_2^{md}$ is 1/16; $\beta_3^{md}$ is 5/16; and $\beta_4^{md}$ is 3/16. It is noted that signal md(x, y) can be calculated from other suitable group of image pixels, such as a group comprising pixels at locations of (x−2, y), (x−2, y−1), (x, y−1), (x+1, y−1), (x, y−1), (x+2, y−1), and (x, y).

The filtered maximum, difference md(x, y) can then be used to derive the recursive coefficient $\alpha_i$ for the illumination component through application of a look-up table (LUT) 123. The look-up table (123) stores the transfer function between input activity and recursive coefficient $\alpha_i$ for the local illumination component F (which will be discussed afterwards). The filtered maximum difference md(x, y) is used as the read address to the programmable look-up table (123).

When md(x, y) is large, the recursive coefficient $\alpha_i$ will be small; and this in turn, creates a local illumination component F, that is approximately equivalent to the noise-free object brightness. In the end, contrast enhancement can be achieved by amplifying the difference between the local illumination component F and the noise-free object, brightness. Lowering the recursive coefficient $\alpha_1$ for the local illumination component in areas of high activity will results in less amplification, which ultimately minimizes the ringing artifact.

The recursive coefficient $\alpha_i$ is passed to F filter 125. The F filter (125) employs an infinite-impulse-response-filter (IIR filter) for deriving the local illumination component signal F from the recursive coefficient $\alpha_1$ and the Y signal. The derivation for signal F uses a temporal and spatial recursive process and derives signal F from a group of image pixels of the input image. In particular, the recursive process calculates signal F from a group of processed pixels with user-defined initial values (boundary values), such as the group of image pixels illustrated in FIG. 6. The temporal and spatial recursive process for signal F is based on equation 11 as shown in the following.

$$F(x,y)=(1-\alpha_i)\times Y(x,y)+\alpha_i\times[\beta_1^F F(x-1,y)+\beta_1^F F(x-1,y-1)+\beta_1^F F(x,y-1)+\beta_1^F F(x+1,y-1)] \quad \text{(Eq. 11)}$$

Figure 9:
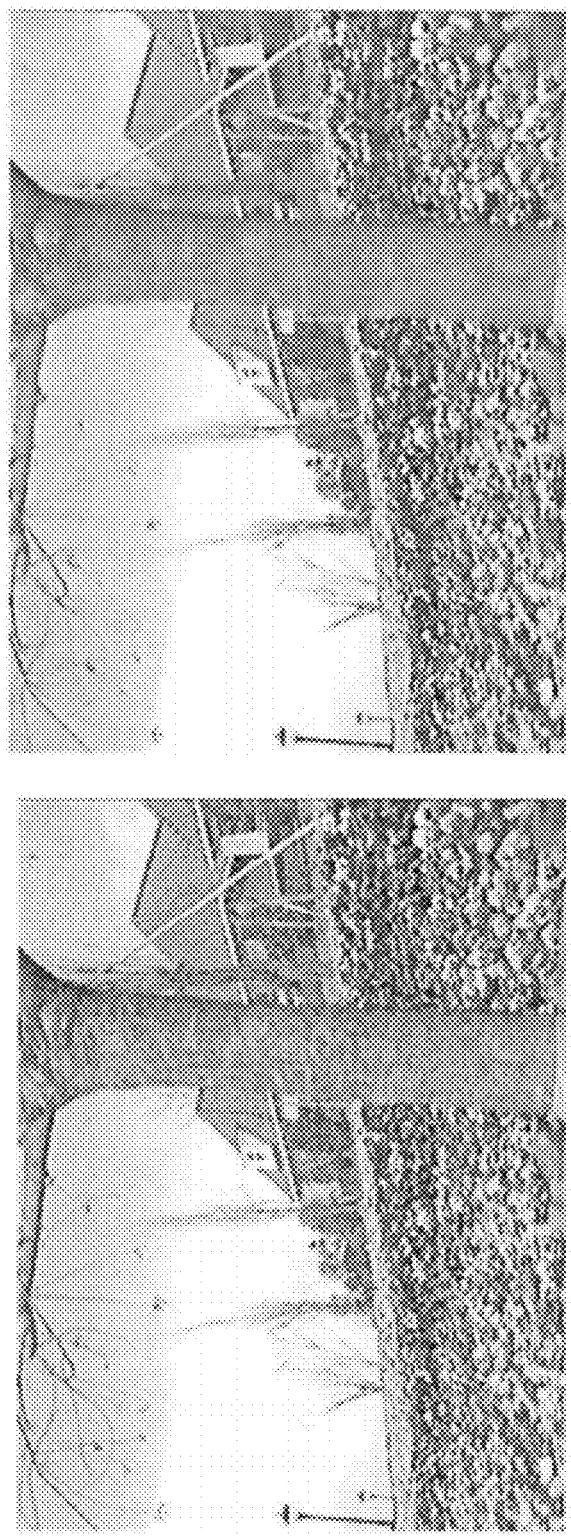
FIG. 9 shows the illumination component of an exemplary image.

In equation 11, F(x, y) is tire illumination component for Y at position (x, y). F(x−1, y), F(x−1, y−1), F(x, y−1), and F(x+1, y−1) are the illumination components for Y at positions (x−1, y), (x−1, y−1), (x, y−1), and (x+1, y−1), respectively. It is noted that signal F can be calculated from other suitable group of image pixels, such as a group comprising pixels at locations of (x−2, y). (x−2, y−1), (x, y−1), (x+1, y−1), (x, y−1), (x+2, y−1), and (x, y). $\alpha_j$ is the recursive coefficient. Coefficients $\beta_i^F$ (including $\beta_1^F$, $\beta_2^F$, $\beta_3^F$, and $\beta_4^F$) can be any suitable values as long as the sum of $\beta_i^F$ is substantially 1 ($\beta_1^F+\beta_2^F+\beta_3^F+\beta_4^F=1$). In general, $\beta_i^F$ can be expressed as $\beta_i^F=Nb/Db$, wherein Nb and Db are integers. For reducing implementation costs, the denominator Nb is preferably (though not required) an integer power of 2, such as $2^m$, wherein m is an integer greater than 1. In one example, $\beta_1^F$ is 7/16; $\beta_2^F$ is 1/16; $\beta_3^F$ is 5/16; and $\beta_4^F$ is 3/16. For demonstration purpose, FIG. 9 shows the local illumination component F for a given input F.

Skin-Pixel Detection

Referring again to FIG. 5, the local-adjustment module (106) further comprises skin-detection-inhibition module 122 as an alternative feature. It is noted that in some examples, however, this skin-detection-inhibition module (122) may not be included in the local-adjustment module (106). Even, though the contrast-enhancement engine (100) may not have the capability of preventing over-enhancement of skin pixels in these examples, the contrast-enhancement engine (100) sill has the capability of enhancing the contrast with minimum noise amplification.

The skin-detection-inhibition module (122) derives a skin-tone probability (PDF) signal from the chrominance components (e.g. $C_bC_r$, SV, or IQ components), which are I and Q components in this example, in the input signal. In one example, a simple 2-dimensional lookup table (LUT) is used to determine the probability PDF that the current pixel (x, y) is from a skin tone, such as a pixel from a face portion of a portrait. The I and Q signals are used as read addresses for the 2-D lookup table. In order to reduce implementation costs, a sub-sampled lookup table may be employed instead. Quantized I and Q signals can be used as read addresses; and a 2-D bi-linear interpolation can be utilized to achieve a higher resolution result. A gain for the current pixel (x, y) is then calculated based upon the obtained skin-tone probability PDF as expressed in equation 12.

$$g(x,y)=PDF \times g_s + (1-PDF) \times g_{nx} \quad \text{(Eq 12)}$$

In equation 12, g(x, y) is the gain for the current pixel (x, y); $g_s$ is the user-defined gain for the skin-tone pixels; and $g_{nx}$ is the user-defined gain for non skin-tone pixels.

It can be seen from equation 12, as the probability PDF increases, indicating that the probability of current pixel (x, y) being a skin-tone pixel is high, the enhancement gain for the current pixel (x, y) is weighted towards the skin-tone gain $g_s$. Conversely, as the probability PDF decreases, indicating that the probability of current pixel (x, y) being a non-skin-tone pixel is high, the enhancement gain for the current pixel (x, y) is weighted towards the non-skin-tone gain $g_{ns}$. This adaptive gain-assignment technique is capable of preventing over-enhancement of skin-tone pixels. For example, it prevents over-enhancement of wrinkle or blemish in a facial portion of a portrait.

Transfer Function Application (TFA)

Referring again to FIG. 5, the calculated signals O and F, as well PDF are passed to transfer-function-application module (124) that calculates an enhanced signal T for the current pixel (x, y) from the O, F, and PDF signals based upon equation 13.

$$T(x,y)=g(x,y) \times [O(x,y)-F(x,y)]+Y(x,y) \quad \text{(Eq. 13)}$$

Because signals O and F are noise-free signals derived from the luminance component Y, T(x, y) amplifies only the difference between O(x, y) and F(x, y) by gain g(x, y). Noise contained in Y(x, y) component is substantially not amplified. In an alternative example, signal T(x, y) can be calculated by replacing Y(x, y) in equation 13 with signal O(x, y) so as to reduce noise, as written in equation 14.

$$T(x,y)=g(x,y) \times [O(x,y)-F(x,y)]+O(x,y) \quad \text{(Eq. 14)}$$

Because signals O and F are noise-free signals and signal T(x, y) being calculated from O and F, noise in the calculated signal T(x, y) is eliminated or minimized.

In examples wherein the contrast-enhancement engine (100) does not include the function of skin-lone detection as discussed above, the transfer-function-application module (124) calculates the enhanced signal T for the current pixel (x, y) from the O and F signals suing either one of the equations of 13 and 14 (or other equations derived from equations 13 or 14). The gain g(x, y) for the difference between O and F can be replaced by a user-defined value.

Limit-Luminance (LLM)

The enhanced luminance signal T(x, y) is expected to be within the bounds of the color gamut of an image presentation device (e.g. a display system). In other words, the brightness of the output pixel (x, y) is expected to be limited, so as to prevent de-saturation. For this reason, the limit-luminance-application module (126) adjusts the input signal T(x, y) based upon the color gamut of the image presentation device. The bounding coefficients can be calculated as follows.

An inv_csc matrix is defined in equation 15.

$$\text{inv\_csc} = \text{inverse} \begin{bmatrix} d_{11} & d_{12} & d_{13} \\ d_{21} & d_{22} & d_{23} \\ d_{31} & d_{32} & d_{33} \end{bmatrix} \quad \text{(Eq. 15)}$$

$$= \text{inverse} \begin{bmatrix} 0.299 & 0.5870 & 0.114 \\ 0.5 & -0.2304 & -0.2696 \\ 0.2023 & -0.5 & 0.2977 \end{bmatrix}$$

$$= \begin{bmatrix} e_{11} & e_{12} & e_{13} \\ e_{21} & e_{22} & e_{23} \\ e_{31} & e_{32} & e_{33} \end{bmatrix}$$

$$= \begin{bmatrix} 1 & 1.1394 & 0.6491 \\ 1 & -0.3242 & -0.67666 \\ 1 & -1.3189 & 1.7816 \end{bmatrix}$$

Coefficients q_coeff1, q_coeff2, and q_coeff3 are defined as follows in equation 16.

$$q\_coeff1 = \frac{e_{23}-e_{13}}{e_{12}-e_{22}} \quad \text{(Eq. 16)}$$

$$q\_coeff2 = \frac{e_{33}-e_{13}}{e_{12}-e_{32}}$$

$$q\_coeff3 = \frac{e_{33}-e_{23}}{e_{22}-e_{32}}$$

Given the matrix elements in matrix inv_csc defined in equation 15 and coefficients q_coeff1, q_coeff2, and q_coeff3 defined in equation 16, output signal Y_out can be derived from signal T(x, y) through the following determination processes.

If the I(x, y) component is larger than both q_coeff1×Q(x, y) and q_coeff2×Q(x, y), variable Y_limit determined by equation 17.

$$Y\_limit = 1 - e_{12} \times I(x,y) - e_{13} \times Q \quad \text{(Eq. 17)}$$

If the I(x, y) component is equal to or less than q_coeff1×Q(x, y) and larger than q_coeff3×Q(x, y), variable Y_limit determined by equation 18.

$$Y\_limit = 1 - e_{22} \times I(x,y) - e_{23} \times Q \quad \text{(Eq. 18)}$$

In all other instances, variable Y_limit determined by equation 19.

$$Y\_limit = 1 - e_{32} \times I(x,y) - e_{33} \times Q \quad \text{(Eq. 19)}$$

Given the determined variable Y_limit(x, y), the output signal T_out(x, y) can be determined as follows. If signal T(x, y) is larger than Y_limit(x, y), the output signal T_out(x, y) is set to Y_limit(x, y). Otherwise, the output signal T_out(x, y) is set to T(x, y). The calculated output signal T_out(x, y) for current pixel (x, y) can then be forwarded to the YIQ-to-RGB conversion module (108) as diagrammatically illustrated in FIG. 1.

It is noted that the above discussion for the limit-luminance module is referred to a particular example wherein YIQ signals are processed. In general the limit-luminance module can perform its operation on video signals in any desired color spaces or formats. The I and Q signals can be replaced by any other chrominance components, such as $C_bC_r$ and SV components. The matrix in equation 15 may have other matrix elements according to the specific chrominance components.

Signal Conversion

Referring again to FIG. 1, if the contrast-enhanced signals Y_out; I, and Q do not match the desired signal format or the color space (e.g. a color space defined by a display system). The enhanced video signals Y_out, I, and Q can be passed to signal converter 108 that converts the enhanced Y_out, I, and Q signals to video signals in the desired format or the color space. In the example as illustrated in FIG. 1, the signal converter 108 converts the enhanced signals Y_out, I, and Q into into R, G, B signals using the conversion matrix in equation 20. In other examples, the signal converter (108) may convert the enhanced Y_out, I, and Q signals to other types of signals, such as YUV signals, $YP_bP_r$ signals, xvYCC signals, HSL signals, and HSV signals)

$$\begin{pmatrix} R \\ G \\ B \end{pmatrix} = \begin{bmatrix} e_{11} & e_{12} & e_{13} \\ e_{21} & e_{22} & e_{23} \\ e_{31} & e_{32} & e_{33} \end{bmatrix} \begin{pmatrix} Y\_out \\ I \\ Q \end{pmatrix} \quad \text{(Eq. 20)}$$

The transfer matrix having matrix elements $e_{ij}$ is the same as that defined in equation 15. It is noted that the transfer matrix may be different for converting Y_out, I, and Q signals into signals in different color spaces.

Figure 10:
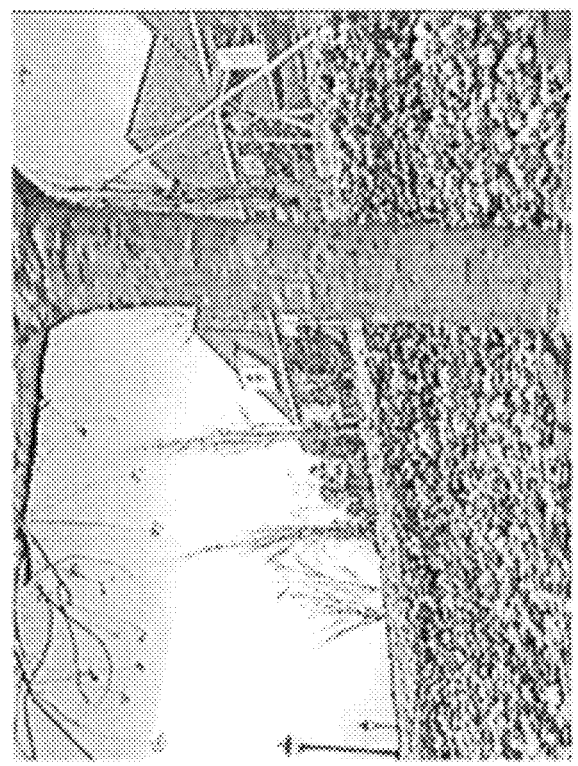
FIG. 10 demonstrates the effect of the contrast-enhancement engine by comparing a pair of exemplary images before and after the application of contrast-enhancement engine.
Figure 10:

For demonstration purpose, FIG. 10 shows two pictures, one is a picture before being enhanced by the contrast-enhancement engine of this disclosure, and the other picture after being enhanced by the contrast-enhancement engine of this disclosure.

It can be seen from the comparison of the two pictures in FIG. 10, the picture after the enhancement has a higher contrast than the raw picture, while the noise level in the enhanced picture is substantially not amplified (e.g. the noise level amount in the sky portion). Sharp transitions, such as the house ridges, tree trunks, and detailed textures in tree bark and house roofs, in the enhanced picture are enhanced. The above comparison and the enhancement effect are better illustrated in FIG. 11.

Figure 11:
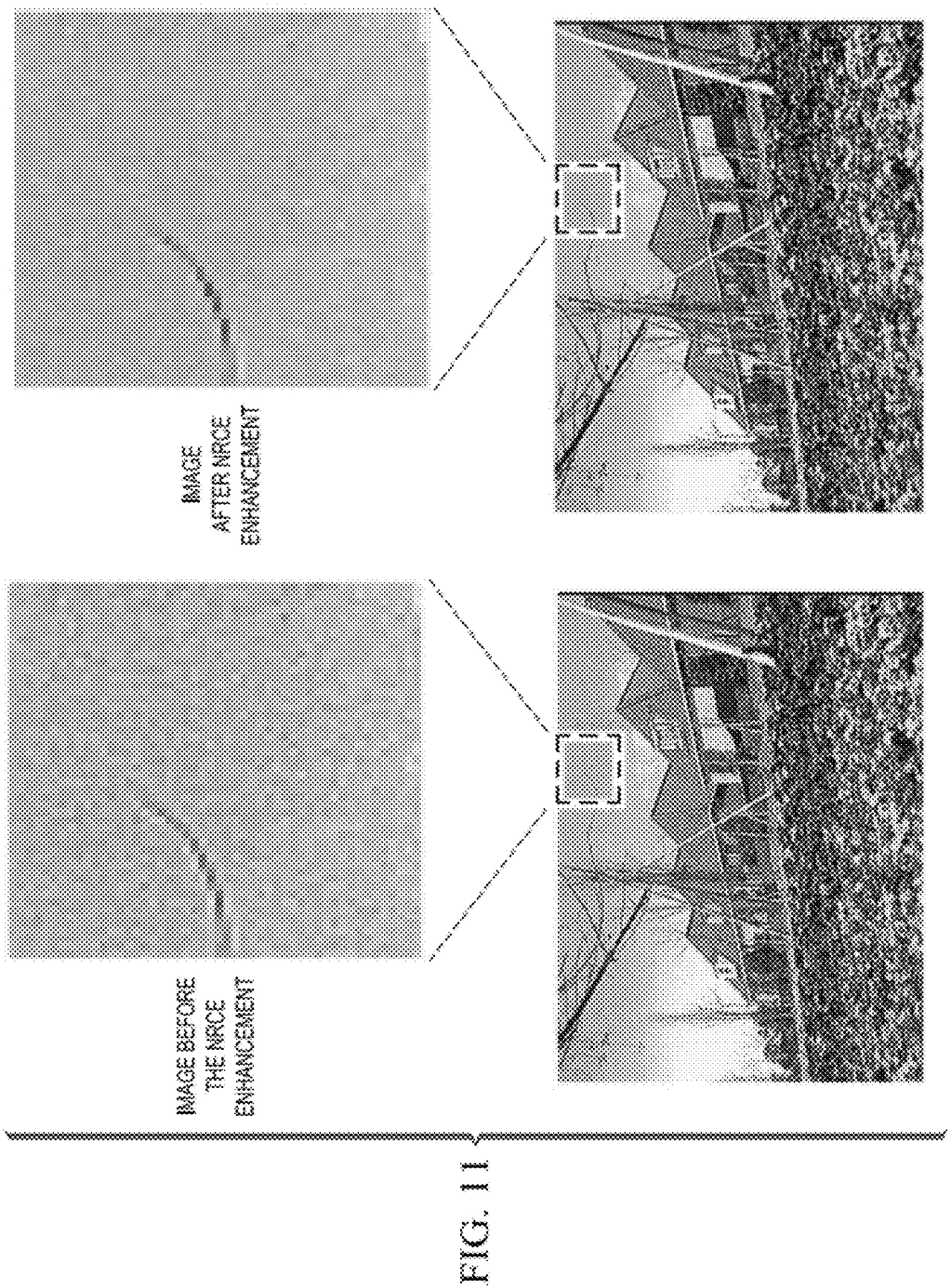
FIG. 11 demonstrates the effect of the contrast-enhancement engine by comparing another pair of exemplary images before and after the application of contrast-enhancement engine.

Referring to FIG. 11, the left picture is before the enhancement; and the right picture is after the enhancement. The sky portions of each picture are shown in the exploded pictures. It can be seen from especially the exploded pictures of the sky portions, the contrast of the branch top of the tree is the enhanced in the right picture (enhanced picture)—for example, the edges of the branch top appear shaper than that in the left picture (raw picture). The noise amount in the right picture is significantly less than that in the left picture.

Figure 12:
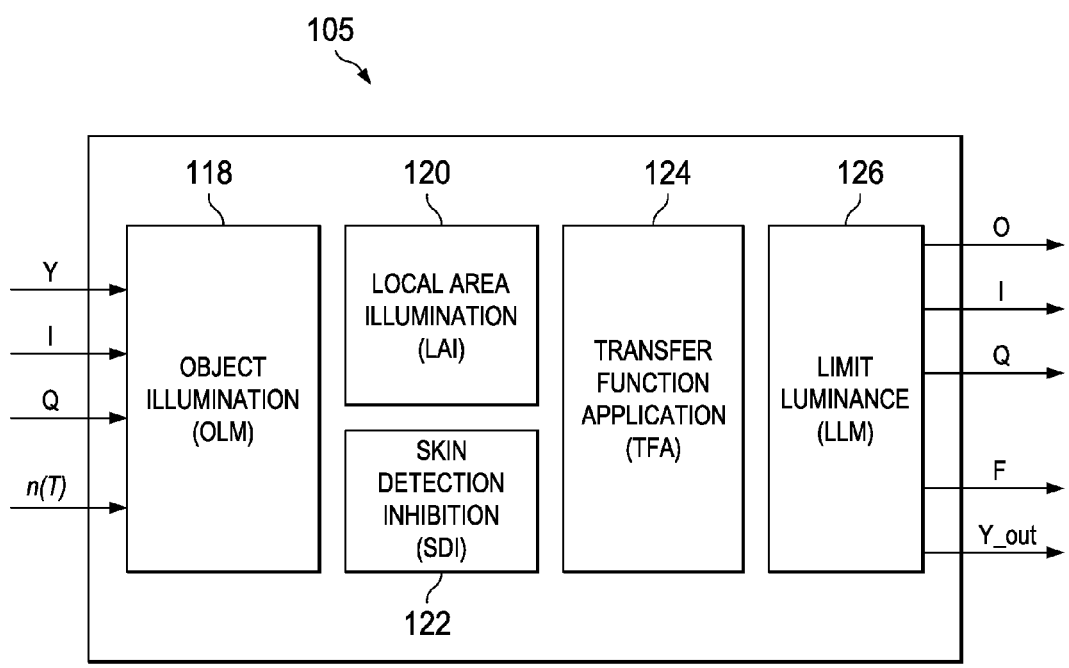
FIG. 12 diagrammatically illustrates another exemplary local-illumination-component module in FIG. 5.

In addition to outputting signal Y_out, signals O and/or F signals can be output in some examples, as diagrammatically illustrated in FIG. 12. Referring to FIG. 12, local-luminance-adjustment 105 can be implemented to output signals O and/or F and/or signal Y_out. The output signal O is a noise-free signal. In particular, signal O contains much less noise (or substantially no noise) than signal Y_out because, as can be seen in equation 13, calculation of signal T also includes signal Y and signal Y_out is derived from signal T. Even though signal F may have more blurry textures than signal Y, signal F maintains sharper edges which can be useful in some particular applications, such as special artificial effects.

The contrast-enhancement engine (100) and any one of its functional members can be implemented in many ways. In one example, the contrast-enhancement engine can be implemented as an electronic circuit, such as an application-specific-integrated-circuit (ASIC) device, a field-programmable-gate-array (FPGA), or a digital-signal-processing unit (DSP). Alternatively, the contrast-enhancement engine can be implemented as a standalone software module comprising computer executable instructions. Such a software module can be stored in any types of storage devices, such as volatile and non-volatile memory storage devices.

Figure 13:
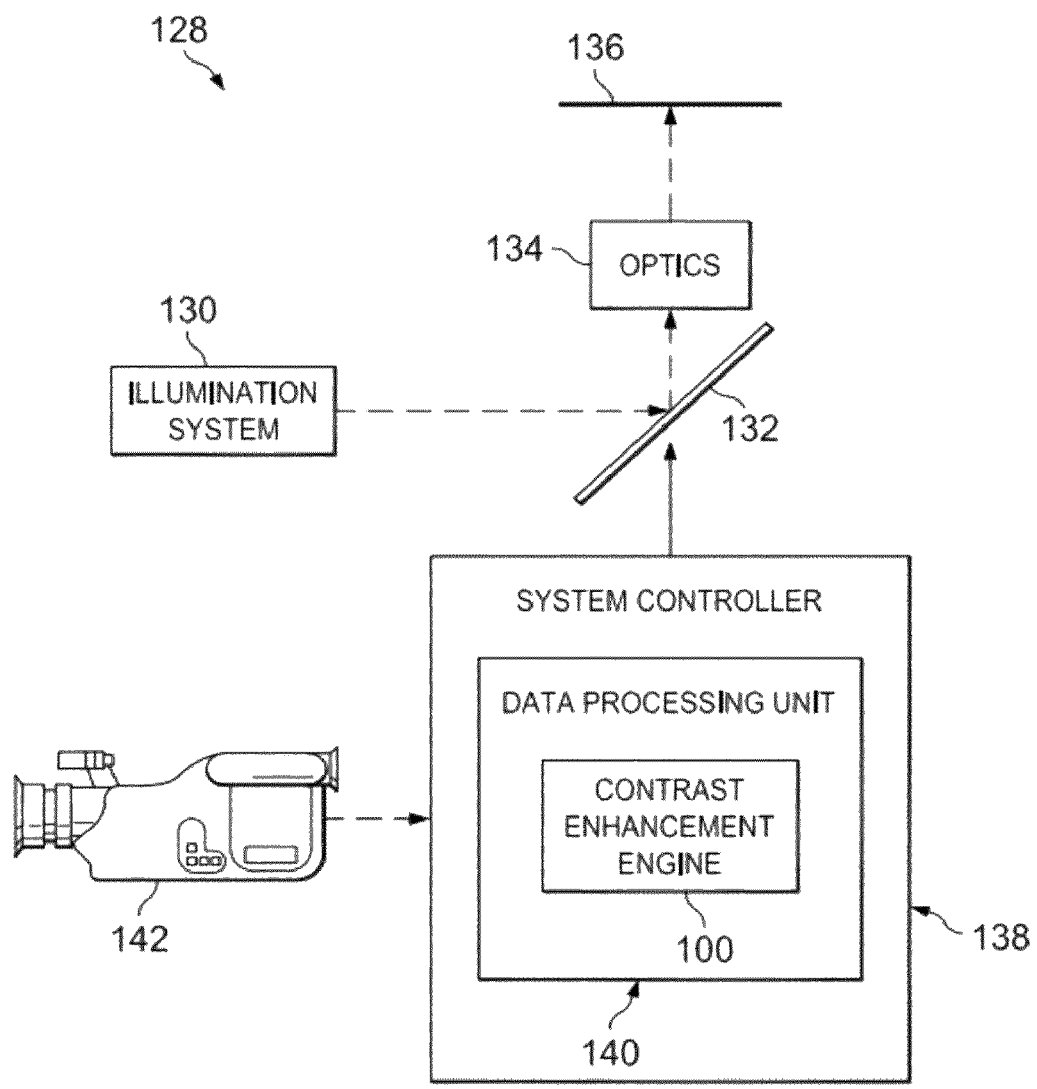
FIG. 13 diagrammatically illustrates an exemplary display system in which an exemplary contrast-enhancement engine is implemented.

The contrast-enhancement engine as discussed above can be used for a wide range of applications, one of which is display systems. For demonstration purposes. FIG. 13 diagrammatically illustrates an exemplary display system with a contrast-enhancement engine implemented therein. Referring to FIG. 13, display system 128 in this example comprises illumination system 130 that provides illumination light for the display system. The light from illumination system 130 is directed to light valve 132 that modulates the incident light and directs the modulated light onto or away from projection optics 134. The projection optics (134) projects the modulated light onto screen 136 so as to generate the desired images. The modulation operation of light valve 132 is based on image data, such as bitplane data from data processing unit 140 of system controller 138. The data processing unit (140) comprises contrast-enhancement engine 100 for processing image data.

The system controller (138) is connected to multimedia source 156, such as a video and/or an image source, which provides multimedia, signals. It is noted that the multimedia source may or may not be a member of the display system. When the multimedia source is not included within the imaging system, the imaging system may have an interface (e.g. HDMI, DVI, s-video, audio, and many other interfaces) for receiving signals from external multimedia sources.

The screen (136) can be a screen on a wall or the like, or can be a member of a rear projection system, such as a rear projection television. In fact, the display system can be any suitable display system, such as a front projector, a rear projection television, or a display unit for use in other systems, such as mobile telephones, personal data assistants (PDAs), hand-held or portable computers, camcorders, video game consoles, and other image displaying devices, such as electronic billboards and aesthetic structures.

Light valve 132 in this example comprises an array of individually addressable pixels for spatially modulating the incident light. The light valve may comprise pixels of many different natures, such as reflective and deflectable micromirrors and liquid-crystal-on-silicon (LCOS) devices. The pixels can be operated using binary or non-binary modes. In the binary mode, each pixel is switched between an ON and OFF state. At the ON state, each pixel modulates the incident light onto the projection optics (134). At the OFF state, each pixel modulates the incident light away from the projection lens. The pixels of the spatial light, modulator alternatively can be operated at a non-binary mode, such as an analog mode wherein multiple intermediate states are defined between an ON and OFF state; and the intermediate states may or may not be continuous between the ON and OFF states. In either binary or non-binary operation mode, color and gray images can be produced using a pulse-width-modulation technique.

It is noted that the light valve (132) can be any suitable devices, such as a spatial light modulator (e.g. a micromirror-based spatial light modulator, a liquid-crystal display panel (LCD), a liquid-crystal-on-silicon (LCOS) based spatial light modulator, a silicon crystal reflective display panel, and an interferometric modulator, etc.). The light valve (132) can also be self-light emitting light valves (e.g. organic light-emitting diode displays and plasma panels), in which examples, illumination system 130 may not be necessary.

Other than display systems, the contrast-enhancement engine (100) as discussed above can be implemented in other image processing devices or image processing software for any desired image processing purposes. For example, the contrast-enhancement engine (100) can be implemented in a graphic card of a computing device or a device with image presenting functions, such as FDA devices.

It will be appreciated by those of skill in the art that a new and useful method and device for contrast enhancement with minimal noise amplification and implementation costs have been disclosed herein. In view of the many possible embodiments, however, it should be recognized that the embodiments described herein with respect, to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for enhancing a contrast of an image, comprising:
    estimating a noise level of the image;
    deriving a first signal from a pixel of the image based upon the noise floor using a first infinite-impulse-response filter, wherein the first signal represents a brightness of the image pixel;
    deriving a second signal from the image pixel using a second infinite-impulse-response filter, wherein the second signal represents an illumination intensity of the image pixel; and
    amplifying a difference between the first and second signals;
    wherein the step of deriving a first signal further comprises applying the first infinite-impulse-filter to a luminance component of the image, wherein a set of coefficients of the first infinite-impulse-filter is determined by a temporal and spatial recursive process having a coefficient that is derived from a set of differences between the first signal and a luminance component of the image at a group of image pixel locations; and
    wherein the step of deriving a second signal further comprises applying the second infinite-impulse-filter to a luminance component of the image, wherein a set of coefficients of the second infinite-impulse-filter is determined by a temporal and spatial recursive process having a coefficient that is derived from a variable and a chrominance component of the image, wherein said variable is derived from a recursive process for a group of image pixels.

2. The method of claim 1, wherein the noise level is a noise floor of the image.

3. The method of claim 1, wherein the step of amplifying a difference between the first and second signals further comprises amplifying the difference between the first and second signals with an amplification factor, wherein said amplification factor is determined based upon a probability that an image pixel is a skin-pixel.

4. The method of claim 1, further comprising:
    calculating an output luminance signal based upon the amplified difference and a luminance component in the input image; and
    limiting the calculated luminance signal within a range of a color gamut.

5. A method for enhancing a contrast in an image, comprising:
    calculating a probability that an image pixel of the image is a skin pixel; and
    enhancing a contrast of the image based upon the calculated probability, wherein the step of enhancing a contrast of the image further comprises:
        estimating a noise floor of the image;
        deriving a first signal from a pixel of the image based upon the noise floor using a first infinite-impulse-response filter, wherein the first signal represents a brightness of the image pixel; and wherein the step of deriving a first signal further comprises applying the first infinite-impulse-filter to a luminance component of the image, wherein a set of coefficients of the first infinite-impulse-filter is determined by a temporal and spatial recursive process having a coefficient that is derived from a set of differences between the first signal and a luminance component of the image at a group of image pixel locations;
        deriving a second signal from the image pixel using a second infinite-impulse-response filter, wherein the second signal represents an illumination intensity of the image pixel; and
        amplifying a difference between the first and second signals with an amplification factor that is determined based upon the calculated probability.

6. The method of claim 5, further comprising:
    applying a low-pass temporal filter to the determined noise floor, wherein said temporal filter comprises a set of filter-coefficients that are determined based upon a noise floor value from one image frame and another noise floor value from a different image frame.

7. A method for enhancing a contrast in an image, comprising:
    calculating a probability that an image pixel of the image is a skin pixel; and
    enhancing a contrast of the image based upon the calculated probability, wherein the step of enhancing a contrast of the image further comprises:
        estimating a noise floor of the image;
        deriving a first signal from a pixel of the image based upon the noise floor using a first infinite-impulse-response filter, wherein the first signal represents a brightness of the image pixel;
        deriving a second signal from the image pixel using a second infinite-impulse-response filter, wherein the second signal represents an illumination intensity of the image pixel; and wherein the step of deriving a second signal further comprises applying the second infinite-impulse-filter to a luminance component of the image, wherein a set of coefficients of the second infinite-impulse-filter is determined by a temporal and spatial recursive process having a coefficient that is derived from a variable and a chrominance component of the image, wherein said variable is derived from a recursive process for a group of image pixels; and
    amplifying a difference between the first and second signals with an amplification factor that is determined based upon the calculated probability.

8. The method of claim 5, further comprising:

calculating an output luminance signal based upon the amplified difference and a luminance component in the input image; and limiting the calculated luminance signal within a range of a color gamut.

9. The method of claim 5, wherein the step of deriving a second signal further comprises:

applying the second infinite-impulse-filter to a luminance component of the image, wherein a set of coefficients of the second infinite-impulse-filter is determined by a temporal and spatial recursive process having a coefficient that is derived from a variable and a chrominance component of the image, wherein said variable is derived from a recursive process for a group of image pixels.

* * * * *